(12) United States Patent (10) Patent No.: US 8,649,266 B2
Adams et al. (45) Date of Patent: Feb. 11, 2014

(54) FLOW STATE AWARE MANAGEMENT OF QOS WITH A DISTRIBUTED CLASSIFIER

(75) Inventors: John Leonard Adams, Felixstowe (GB); Rajagopalan Krishnamurthy, Cupertino, CA (US)

(73) Assignee: Lester F. Ludwig, San Antonio, TX (US)

( * ) Notice: Subject to any disclaimer, the term of this patent is extended or adjusted under 35 U.S.C. 154(b) by 356 days.

(21) Appl. No.: 12/844,782

(22) Filed: Jul. 27, 2010

(65) Prior Publication Data

US 2011/0019551 A1 Jan. 27, 2011

Related U.S. Application Data

(60) Provisional application No. 61/228,950, filed on Jul. 27, 2009.

(51) Int. Cl.
*H04L 1/00* (2006.01)
*H04L 12/26* (2006.01)

(52) U.S. Cl.
USPC .......................................................... 370/235

(58) Field of Classification Search
None
See application file for complete search history.

*Primary Examiner* — Ayaz Sheikh
*Assistant Examiner* — Blanche Wong
(74) *Attorney, Agent, or Firm* — Cory Procopio; Hargreaves & Savitch LLP

(57) ABSTRACT

Packet network node and method of operating packet network node. Conventional packet network nodes react to congestion in packet network by dropping packets in a manner which is perceived by users to be indiscriminate. In the described system, indiscriminate packet discards are prevented by causing packets to be discarded on lower priority flows and flow aggregates. Further action is taken to reduce the likelihood of packet discards through: (1) classification of flows that are not observable at the point in the network where flow-based packet discards are deployed, but are consuming bandwidth and signaling classification information to flow-based packet discard function or a flow-based monitoring function or network management function; (2) classification of flows making use of extended monitoring functions that are not co-located with a flow-based packet discard function, where extended monitoring functions may perform monitoring of a flow or a group of flows over a period of time.

8 Claims, 13 Drawing Sheets

FSA signalling procedure for each service context

Figure 1: FSA signalling procedure for each service context

Figure 2: Out-of-band signalling combined with flow-based QoS

Figure 3: Network configuration

Figure 4: Multicast flows copied and distributed at a DSLAM

Figure 5: Two or more different Service Providers with separate FSA QoS management sharing a common link to the end user Figure 6: Remote FSA Monitor function Figure 7: Expansion of function 6

Figure 8: Expansion of function 6.1

Figure 9: Expansion of function 40

Figure 10: Another embodiment of function 6 with additional API function 6.6

Figure 11: Alternative embodiment of function 40 with additional API function 6.6

Figure 12: Another embodiment of function 6.4

FLOW STATE AWARE MANAGEMENT OF QOS WITH A DISTRIBUTED CLASSIFIER

CROSS-REFERENCE TO RELATED APPLICATIONS

This regular U.S. patent application relies on and claims the benefit of priority under 35 U.S.C. 119(e) from U.S. provisional patent application No. 61/228,950, the entire disclosure of which is incorporated by reference herein.

BACKGROUND OF THE INVENTION

1. Field of the Invention

The present invention relates to a communications network and a method of operating a communications network.

2. Description of the Related Art

Recently, the demand for streaming video to a computer via the Internet has grown strongly. This has led to a need to supply increasing amounts of video material over local communication networks (including the copper pairs used by telephone network operators or the coaxial cables used by cable television network operators).

In telephony networks this additional demand is being met partly by the introduction of Digital Subscriber Loop (DSL) technology. As its name suggests, this technology carries digital signals over the local copper loop between a user's home and a local telephone exchange. Data-rates of several megabits per second to the user's home have become commonplace. Advances in this technology now lead to much higher rates, 20 Mbit/s and above and with plans in the industry to offer 50 Mbit/s and above to a substantial proportion of broadband end users in the relatively near future. Using DSL, the digital signal is conveyed between modems placed at either end of the copper loop. The advantages of statistical multiplexing have led to the digital signals being organised into transport packets (whether they be Asynchronous Transfer Mode (ATM) packets or Ethernet packets. Over either of these are carried Internet Protocol (IP) packets conveying all of the broadband services.

Cable networks have also been upgraded to carry broadband services to user's homes. Substantial numbers of users currently receive broadband services over cable and, again, the services are conveyed using IP packets over Ethernet.

Video material requires a data rate which varies between 1.5 Mbps (for a quality comparable to that offered by a video cassette recording) to 20 Mbps (High-Definition Television). In DSL or cable networks, these higher application data rates means that a mechanism is needed to manage contention for the capacity available towards the user's home. This capacity management includes both the maximum available capacity for any one user and the shared capacity towards the DSL Access Multiplexer (DSLAM) or Cable Modem Termination System (CMTS). This capacity (sometimes termed "backhaul" capacity) may be shared by several hundred users, and contention for the capacity will also need to be managed as users demand more choice in the material they view.

SUMMARY OF THE INVENTION

One or more embodiments of the present invention overcome various shortcomings of the conventional technology for operating a communication network, allowing service providers or capacity wholesalers to:

Classify flows that are not observable at the point in the network where Flow State Aware QoS management is deployed, but are consuming bandwidth and signal said classification information to a Flow State Aware QoS function or a monitoring function or network management function.

Classify flows making use of extended monitoring functions that are not co-located with QoS functions, where extended monitoring functions may perform monitoring of a flow or a group of flows over a period of time, and may determine trends or patterns occurring on a flow or a sequence of flows or a group of flows, and signal said classification information to a Flow State Aware QoS function or another monitoring function or network management function.

Adjust the dynamic levels of bandwidth available along VLANs or other flow aggregates and/or adjust the level of packet discards required among the flows that are observable or detectable at the point in the network where Flow State Aware QoS management is deployed.

Perform distributed monitoring and trend analysis of flows that may be physically separated in the network but could be following similar trends in rate change, frequency of flow initiation, or other trends.

According to the present invention, there is provided a method of operating a packet subnet that aims to solve the problem of managing contention in a packet network by managing the QoS treatment of different flows and groups of flows including:

Preference priority control of some flows in the event of congestion or sudden re-routing of traffic in the event of a network link failure.

Measurement and monitoring functions that determine the identity of flows or groups of flows and determine traffic rates or jitter in rates or capacity usage related to one point in the said subnet and may determine or predict trends of these said measured quantities over a time interval and determine, through said measurements or monitoring or trend predictions, information that relates to the QoS treatment of said flows or groups of flows and forward that information to another Flow State Aware function performing QoS or monitoring functions at another point in the said subnet, where the said forwarded information includes the flow or flow group identity or flow identities and the said determined QoS treatment information.

According to a first aspect of the present invention, the said method of operating the subnet comprises:

Receiving one or more communication packets indicative of the commencement of a packet flow through said subnet, said packet flow comprising one or a plurality of packets.

Responsive to recognition of the commencement of a new packet flow, storing a flow identifier, enabling identification of packets belonging to said commenced packet communication flow.

Responsive to recognition of the commencement of said new flow, retrieving policy information relating to the determination of initial or sustained QoS treatment of the flow, where said policy information may additionally include the identity of one or more functions that should be informed or alerted about new flows or monitoring or QoS treatment information related to flows, and where said functions may be located at one or more different points of the said subnet, and where said determination of initial or sustained QoS treatment is derived from policy information and monitored information about the said new flow, including, but not limited to:

packet header information at any level of encapsulation;
received signaling information related to that flow identity;

the physical link on which the packet arrived or will depart;

measured rates applying to the flow rate of the said flow, or the measured jitter in flow rate;

measured rates applying to the total traffic on one or more aggregates which the said new flow is associated with, or the measured jitter in such said rates;

determined trends in said measured quantities over an interval of time or correlated trends in said measured quantities on different flows or groups of flows on the same aggregate or different aggregates.

Responsive to recognition of the commencement of said new flow, and to retrieved policy information, and monitored information, and where the retrieved policy information indicates that there are said network functions that may be located at different points in the said subnet that should be informed or alerted, then forwarding signals that can be conveyed to the said network functions by the said packet subnet or through dedicated links, where such signals will include the identity, or identities, of the flow or group of flows or flow aggregate together with said monitored information related to the said identity or identities of said flows or groups of flows or aggregates.

According to this first aspect of the present invention, a method where classification information is determined relating to the QoS treatment of a flow or a group of flows or a flow aggregate and is included in the said signals conveyed to other Flow State Aware network functions such that:

Optionally, an initial signal may be forwarded to other Flow State Aware network functions without including classification information.

Additional signals may be forward to other Flow State Aware network functions relating to an existing flow, group of flows, or a flow aggregate when a classification has been determined or re-determined.

According to this first aspect of the present invention, a method where, responsive to the determination of the cessation of a flow or a group of flows or a flow aggregate, including determinations of cessation through the receipt of signaled information or determinations of cessation through the observation of no further packet arrivals for a pre-determined time interval associated with the flow identity or identities of the flow or group of flows or flow aggregate, and where the retrieved policy information indicates that there are said network functions that may be located at different points in the said subnet that should be informed or alerted based on said cessation determination, then forwarding signals that can be conveyed to the said network functions by the said packet subnet or through dedicated links, where such signals will include the identity, or identities, of the flow or group of flows or flow aggregate together with the said cessation determination related to the said identity or identities of said flows or groups of flows or aggregates.

According to this first aspect of the present invention, a method where the receiving of said signals at a Flow State Aware network function and the inclusion of the said identity or identities of the flow or group of flows or flow aggregates in the signaled information is used to compare with the said store of flow identities of flows at the said signal-receiving Flow State Aware network function to determining either:

New flow identities not included in the said store of flow identities at the said signal-receiving Flow State Aware network function.

Existing flow identities already included in the said store of flow identities at the said signal-receiving Flow State Aware network function, where a further comparison of the said signaled classification information with the classification information already stored on the said signal-receiving Flow State Aware network function indicates that the QoS treatment of the flow or group of flows or flow aggregate should be modified.

According to this first aspect of the present invention, a method where, on determination at the said signal-receiving Flow State Aware network node, that the signaled flow identity or identities are not included in its said store of flow identities, modifies its said store of flow identities to include the signaled flow identity or identities and store the signaled flow classification information such that this may be associated with said signaled flow identity or identities, and retrievable from the said store of classification information by inspection of stored information related to flow identity or identities.

According to this first aspect of the present invention, a method where, when the said signal-receiving Flow State Aware network node performs QoS management of flows, which may include packet discard actions based on flow rate or jitter in flow rate, and where the said signal-receiving Flow State Aware network node determines that the said signaled flow identity or identities are not included in its said store of flow identities, modifies its QoS management of flows so that:

Where flows or aggregates or groups of flows are monitored by the said signal-receiving Flow State Aware network node so that the flow rate or rate jitter of said flows or groups of flows or flow aggregates is checked against permissible rate or jitter limits, the said limits are adjusted to take account of the extra capacity assigned to the said signaled flow identity or identities, where said adjustments and said extra capacity assignments may be included with, or determined from, the said signaled classification information associated with the said signaled flow identity or identities, or determined from the said monitored information included in the said signal.

Where the signal indicates the said signaled flow identity or identities have ceased to flow, and where flows or aggregates or groups of flows are monitored by the said signal-receiving Flow State Aware network node so that the flow rate or rate jitter of said flows or groups of flows or flow aggregates is checked against permissible rate or jitter limits, the said limits are adjusted to take account of the capacity assigned to the said signaled flow identity or identities, where said adjustments and said capacity assignments may be included with, or determined from, the said signaled classification information associated with the said signaled flow identity or identities or determined from the said monitored information included in the said signal.

According to this first aspect of the present invention, a method where, on receipt of a said signal including said signaled flow identities, and when the said signal-receiving Flow State Aware network node performs monitoring functions relating to flows, groups of flows, or flow aggregates, the said monitoring function at this said node may be adjusted so that:

Monitoring of flows, or groups of flows, or flow aggregates is commenced on flow identities not included in the said signaled flow identity or identities, so that trends or correlations on flows additional to the flows included in said signal may be detected.

Monitoring of flows, or groups of flows, or flow aggregates is commenced on flow identities included in the said signaled flow identity or identities, so that packet losses and packet delays may be detected.

According to this first aspect of the present invention, optionally a method where said Flow State Aware network functions discover neighbouring Flow State Aware network functions and their network addresses through additional discovery signaling where the said discovery signals may include information on VLAN identities or end-user or service provider identities, enabling any first said Flow State Aware network function to store policy information relating to other said Flow State Aware network functions that may be located at different points in the said subnet that should be informed or alerted of said flow commencement and cessation detections and said classification determinations or said monitoring information by said first Flow State Aware network function.

According to a second aspect of the present invention, there is provided a packet network node comprising:

an input for receiving one or more packets;

means arranged in operation to store a flow identifier corresponding to a flow, such that packets detected at said input can be associated with one of the said stored flow identifiers or can be determined to be a new flow;

means arranged in operation to measure a packet rate or byte rate in said packet network node, relating to any flow or group of flows, and means to detect an excessive packet rate or byte rate, including the use of any associated limits of rate or rate jitter assigned to such a flow or group of flows;

means arranged in operation to detect excessive packet bursts or jitter in the packet or byte rate in said packet network node relating to any flow or group of flows including the use of associated limits of burstiness or jitter assigned to such a flow or group of flows;

means arranged in operation to retrieve policy information and QoS treatment determination associated with the flow identifier corresponding to the latest arriving packet, and determined through policy information and monitored information including, but not limited to:

packet header information at any level of encapsulation;

received signaling information related to that flow identity;

the physical link on which the packet arrived or will depart;

measured rates applying to the flow rate of the said flow, or the measured jitter in flow rate;

measured rates applying to the total traffic on one or more aggregates which the said new flow is associated with, or the measured jitter in such said rates;

determined trends in said measured quantities over an interval of time or correlated trends in said measured quantities on different flows or groups of flows on the same aggregate or different aggregates.

means arranged in operation to forward signals to, or receive signals from, network functions via the said packet subnet or through dedicated links, where such signals will include the identity, or identities, of flow or group of flows or flow aggregates together with said monitored information related to the said identity or identities of said flows or groups of flows or aggregates.

According to this second aspect of the present invention, the packet network includes further means arranged in operation to:

Classify a flow based on said policy information and said monitored information, such that said classification of any flow indicates the QoS treatment to be applied to that flow including, but not limited to:

Preference priority to be applied to the flow at a Flow State Aware network node to determine its probability of being selected for packet discards in the event of congestion conditions.

Guaranteed bandwidth to be assigned to the flow.

Expected rate or measured rate of the flow.

Delay limits to be applied to the flow relating to the scheduling of its packets at a Flow State Aware network node for forwarding on an output link.

Include said classification information in said signals to be forwarded to network functions via the said packet subnet or through dedicated links, or means arranged in operation to receive classification information from said signals and to assign said signaled classification information to a flow identity or identities, or to the identity of a group of flows or flow aggregate such that classification information is retrievable by inspection of stored information related to flow identity or identities.

According to this second aspect of the present invention, the packet network includes further means arranged in operation to:

Detect the cessation of a flow including, but not limited to:

Means arranged in operation to detect the cessation of a flow, or of a group of flows, or flow aggregate through the absence of any received packet belonging to that flow for a pre-determined time interval.

Means arranged in operation to detect the cessation of a flow, or of a group of flows, or flow aggregate through the reception of signaled information including cessation information.

Include said cessation information in said signals to be forwarded to network functions via the said packet subnet or through dedicated links, or means arranged in operation to receive cessation information from said signals and means arranged in operation to delete a flow identifier from the said store of flow identifiers together with said classification information related to said deleted flow identifier.

According to this second aspect of the present invention, the packet network includes further means arranged in operation to determine that the said signalled flow identity or identities are included or are not included in its said store of flow identities and, means arranged in operation to perform packet discard actions based on excess flow rate or excess jitter in flow, so that:

Where, optionally, means are arranged in operation so that flows or aggregates or groups of flows are monitored by the said signal-receiving Flow State Aware network node so that the flow rate or rate jitter of said flows or groups of flows or flow aggregates is checked against permissible rate or jitter limits, and where a signaled flow identity was not previously included in said store of said Flow State Aware network node, then means are arranged in operation so that said limits are adjusted to take account of any extra capacity assigned to the said signaled flow identity or identities, where said means determine said adjustments from the said signaled classification information associated with the said signaled flow identity or identities, or determined from the said monitored information included in the said signal.

Where the signal indicates the said signaled flow identity or identities have ceased to flow, and where, optionally, means are arranged in operation so that flows or aggregates or groups of flows are monitored by the said signal-receiving Flow State Aware network node so that the flow rate or rate jitter of said flows or groups of flows or flow aggregates is checked against permissible rate or jitter limits, then means are arranged in operation so that said limits are adjusted to take account of the capacity assigned to the said signaled flow identity or identities, where said adjustments and said capacity assignments may be determined by said means from the said signaled classification information associated with the said signaled flow identity or identities or determined from the said monitored information included in the said signal.

According to this second aspect of the present invention, the packet network includes further means arranged in operation so that where, on receipt of a said signal including said signalled flow identities, and when, optionally, the said signal-receiving Flow State Aware network node contains means arranged in operation to perform monitoring functions relating to flows, groups of flows, or flow aggregates, the said monitoring means at this said node are responsive to said signaling information so that:

Monitoring of flows, or groups of flows, or flow aggregates is commenced on flow identities not included in the said signaled flow identity or identities, so that trends or correlations on flows additional to the flows included in said signal may be detected by means arranged in operation to determine trends utilizing monitored data available at one or more Flow State Aware network nodes.

Monitoring of flows, or groups of flows, or flow aggregates is commenced on flow identities included in the said signaled flow identity or identities, so that packet losses and packet delays may be detected by means arranged in operation to perform packet loss and delay calculations utilizing monitoring data shared or signaled between Flow State Aware network nodes.

According to this second aspect of the present invention, the packet network includes further means arranged in operation so that a Flow State Aware network function can discover neighboring Flow State Aware network functions and their network addresses through additional discovery signaling where the said discovery signals may include information on VLAN identities or end-user or service provider identities, including means arranged in operation enabling any first said Flow State Aware network function to store policy information relating to other said Flow State Aware network functions that may be located at different points in the said subnet that should be informed or alerted of said flow commencement and cessation detections and said classification determinations or said monitoring information by said first Flow State Aware network function.

Using the above methods and means, a packet subnet operator is able to obtain the following advantages:

Classify flows such as multicast flows that are not observable at the point in the network where Flow State Aware QoS management is deployed, but are consuming bandwidth and signal said classification information to a Flow State Aware QoS function.

Classify flows making use of monitoring functions that perform trend analysis either locally or through sharing data with other monitor functions.

Adjust the dynamic levels of bandwidth available along VLANs to take account of multicast flows or the convergence of flows from multiple service providers that could potentially cause congestion downstream from a Flow State Aware QoS management function.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

As would be appreciated by those of skill in the art, the backhaul capacity may be divided into VLANs, where each VLAN is the aggregate bandwidth that a single internet service provider can exploit to deliver services to many end-users. In this case, the active users who are receiving internet services via this service provider will share the capacity of this VLAN aggregate.

In an alternative arrangement, several internet service providers may jointly share the backhaul capacity and some means may be provided so that each service provider obtains a fair share.

In another arrangement (see FIG. 4), services to end users are partly delivered by a multi-cast function that resides in, for example, the DSLAM or CMTS. In this case one or more of the flows that an end user is receiving may not be visible or detectable at any point in the network that is upstream from the DSLAM or CMTS.

In a further arrangement (see FIG. 5), an end user receives services from two or more service providers along separate aggregate feeds, for example separate VLANs. In this arrangement, none of the service providers can observe all of the flows which an end user is currently receiving whenever some flows that are currently being received are within a VLAN or backhaul aggregate that is associated with a different service provider than other flows that are currently being received.

Figure 6:
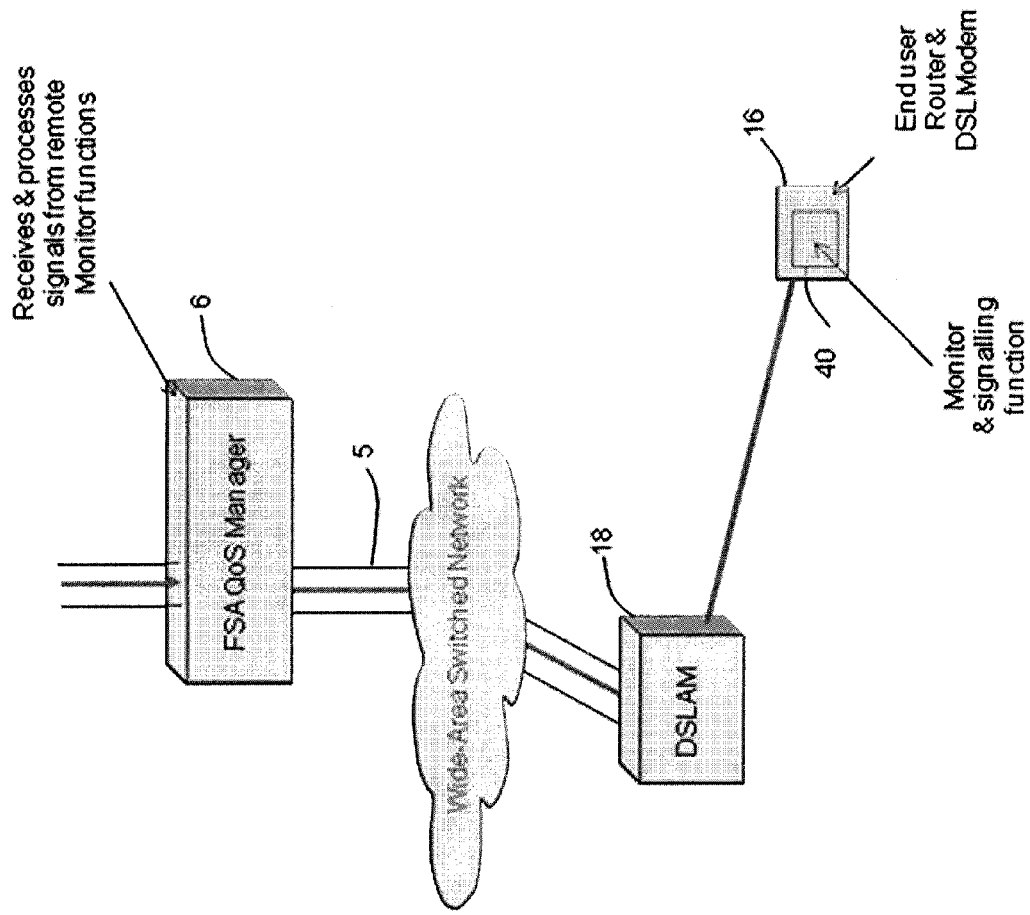
FIG. 6 illustrates a scenario where an additional monitoring and signaling function (function 40) is deployed to inform the FSA QoS manager about flows or traffic trends that it may not directly observe.

In a further arrangement (see FIG. 6) a flow is observable at a QoS manager, but is subject to further monitoring at a second point in the network. This monitoring may include the monitoring of a single flow, or monitoring of trends or patterns that can be derived by monitoring flows over a period of time. In this arrangement, the monitoring function alerts the QoS function of classification information related to a flow or group of flows that is derived from extensive monitoring including patterns and trends.

The cases or arrangements that involve:
multicast functions,
separate service feeds along separate Service Provider specific aggregates or VLANs,
extended monitoring of flows at a remote point from a QoS manager
are related to various embodiments of the inventive technology. In particular, various embodiments of the inventive concept provide distributed classifier function that allows a Service Provider to become aware of a flow or group of flows that it is not able to directly observe, or where it is not able to perform extended monitoring, and make allowances for the bandwidth that such a flow or group of flows may consume or should be restricted to consume.

In a conventional circuit-switched telephone network, the problem of contention for scarce telecommunication resources is dealt with by simply preventing a user from receiving (or sending) any traffic unless the necessary capacity to carry that traffic can be reserved beforehand. The capabilities of multi-services packet networks have also been developed to include call admission control schemes—examples include the Resource Reservation Protocol (RSVP). Although such schemes can prevent congestion when all new communications or calls are admitted or rejected using these principles, QoS management must also manage so-called "elastic" traffic where there is potentially a need for a minimum guaranteed rate but frequently a desire to transmit the flow as fast as possible, subject to network congestion constraints and constraints on maximum sending rates.

An alternative to the use of connection admission control in packet networks is to use reactive flow control. These schemes allow users access to communications resources but attempt to cause senders to decrease their sending rate on the onset of congestion. The scheme used for reliable transmission across the Internet (Transmission Control Protocol) is the most common example. This is unsuitable for video flows however, since real-time video servers cannot reduce their sending rate.

Most flow control schemes, applied to elastic applications, result in some reduction of the rate available at the onset of congestion. Some flow control schemes are more sophisticated, classifying traffic into different classes, with some classes being more likely to suffer packet delay or discard than others. In situations where such classification is not available or where most traffic is within one class, alternative solutions must be provided. One such alternative solution which concentrates the adverse effects of ATM cell discard on one IP packet at a time is described in 'Early Selective Packet Discard for Alternating Resource Access of TCP over ATM-UBR' by Kangsik Cheon and Shivendra S. Panwar, in the Proceedings of IEEE Conference on Local Computer Networks LCN 97, Minneapolis, Minn., Nov. 2-5, 1997.

A discussion toward the Internet based Next Generation Network (NGN) is actively progressed around the standards bodies including the ITU-T (International Telecommunication Union-Telecommunication Standardization Sector) and ETSI (European Telecommunications Standards Institute), IEEE (Institute of Electrical and Electronics Engineers), IETF (Internet Engineering Task Force), and etc. The roles of the standard bodies are different. The IEEE and IETF develop the core technology for specific problems in layer 2 and layer 3, respectively. ITU-T and ETSI develop the network architecture and control procedure.

A QoS control or resource control architecture has been developed in the several standard bodies. To name a few, they are ITU-T, ETSI, Cable Lab, 3GPP, MSF, and the DSL forum. Among those organization, CableLab, and DSL forum, 3GPP, and ETSI define the QoS control architecture in a particular case while ITU-T defines the generic architecture that can cover the outcomes of other standard bodies.

CableLab defines the dynamic QoS (DQoS) control architecture, as described in PacketCable specification PKT-SP-DQOS-I10-040721 "PacketCable Dynamic Quality-of-Service", for the Hybrid Fiber and Coaxial (HFC) network. The control architecture is designed for the uniqueness of the HFC network. In the HFC network, multiple CMs (Cable Modems) share an upstream channel to CMTS (Cable Modem Termination System). The bandwidth is controlled based on layer 2 MAC protocol called DOCSIS (Data Over Cable System Interface Specification), as described in "Data-Over-Cable Service Interface Specifications, Radio Frequency Interface Specification", Cable Television Laboratories, Inc., SPRFIv1.1-I10-030730, Jul. 30, 2003. The layer 2 level QoS guarantee mechanism is defined from the DOCSIS version 1.1. The goal of the DQoS is supporting the QoS guaranteed service through HFC network.

DQoS defines the procedure of the call setup signaling and the dynamic QoS control on DOCSIS interface. In the architecture, the CMS (Call Management Server)/Gate controller controls the call establishment. The guaranteed bandwidth between CM and CMTS is reserved dynamically during the call setup signaling. The CMS/Gate Controller triggers the layer 2 or layer 3 QoS signaling to reserve the bandwidth in the HFC network by sending commands to CM, CMS, or MTA (Multimedia Terminal Adapter).

DQoS has been refined through version 1.0, 1.5, and 2.0. Version 1.0 defines the basic call setup signaling procedure for both embedded MTA and standalone MTA. The embedded MTA can initiate the dynamic layer 2 QoS signaling while a standalone MTA initiates IP level QoS signaling. Version 1.5 and 2.0 defines the QoS control architecture when SIP (Session Initiation Protocol) based call setup signaling is used. DQoS 2.0 is defined especially for interoperability with IP Multimedia Subsystem (IMS) which is the SIP based call setup architecture developed in 3rd Generation Partnership Project (3GPP). PacketCable Multimedia, as described in PacketCable Specification PKT-SP-MM-I03-051221, "Multimedia Specification", Dec. 21, 2005, has been developed for simple and reliable control for the multimedia service over cable network. It defines the service delivery framework for the policy based control on multimedia service. The simple procedure for time or volume based resource authorization, resource auditing mechanism, and security of the infrastructure are defined in PacketCable Multimedia.

Such developments as this strongly suggest that new QoS mechanisms should take account of, and build on top of, the underlying deployment of QoS controls.

Again, the DSL forum defines the resource control at the DSL (Digital Subscriber Line) access network, as described in Technical Report 59 DSL Forum "DSL Evolution-Architecture Requirements for the Support of QoS-Enabled IP Services". Unlike Cable network, DSL modem is connected to the subscriber through the dedicated line. Layer 2 level dynamic QoS control between DSL modem and Digital Subscriber Line Access Multiplexer (DSLAM) is not required. The DSL forum focuses more on resource control in the home network especially resource control of multiple terminals behind the home gateway.

The resource control architectures defined in the above mentioned two standard bodies—PacketCable and DSL Forum focus on a specific transport technology (i.e., HFC network and DSL network). The scope of DQoS and DSL forum is mainly within network operator's view. Unlike these, RACF (Resource and Admission Control Functions), as described in ITU-T recommendation Y.2111 "Resource and Admission Control Functions in NGN", of ITU-T and RACS (Resource and Admission Control Sub-system), as described in ETSI ES 282 003 V1.1.1 (2006-03), "Resource and Admission Control Sub-system (RACS); Functional Architecture", of ETSI define the resource control architecture in more general aspect.

The QoS control architecture in both RACF and RACS are closely related with 3GPP (3rd Generation Partnership Project) effort. The 3GPP is originally founded for developing new service architecture over cellular network, especially for GSM (Global System for Mobile communication) network. During this effort, 3GPP developed the IMS (IP Multimedia Subsystem) for controlling the IP multimedia services in the areas of session control, service control, and management of database of the subscribers. Even though IMS is initially developed for the evolution of GSM cellular network, its framework can be applicable for any types of transport technologies. The IMS architecture has been adopted to the other QoS control architectures such as 3GPP2 MMD (Multimedia Domain), ETSI TISPAN (Telecoms & Internet converged Services & Protocols for Advanced Networks), and ITU-T NGN. Thus, both RACS and RACF are interoperable with IMS.

In general, RACF and RACS are very similar with each other. The two standards bodies are closely interacted in developing their architecture. There is no significant conflict between the two, but there are still differences, as described in ITU-T NGN-GSI contribution, Kobe-Q04-13-014, "Comparison of TISPAN RACS and ITU-T RACF". One of differences is the range of the control region. The control region of RACS covers the access network and the edge of the core network. The access network is defined as the region where the traffic is aggregated or distributed without dynamic routing. The resource control in the access network is done in layer 2 level. The core network is the region that the IP routing starts. The core network is out of scope in the RACS. RACF, however, covers both core and access network. RACF covers both fixed and mobile networks while RACS is defined for the fixed network. For the control mechanism, the RACF defines more control scenarios than RACS. Therefore, RACS is considered as a subset of RACF.

ITU-T defines QoS control functions based on its NGN architecture. One of the important concepts in the ITU-T NGN architecture is the independence of the transport and the service, as described in ITU-T recommendation Y.2012 "Functional Requirements and Architecture of the NGN". The transport is concerning about the delivery of packets of any kind generically, while the services are concerns about the packet payloads, which may be part of the user, control, or management plane. In this design principle, the NGN architecture is divided into two stratums—Service Stratum and Transport Stratum. Under the concept of the independence of a service and transport functions, the network resource and reliability are guaranteed by the network side upon request from the service stratum. Service Stratum is responsible for the application signaling and Transport Stratum is responsible for reliable data packet forwarding and traffic control. The service stratum can be a simple application server or a full-blown system such as IMS (IP Multimedia Sub-system).

Transport control function is located in Transport stratum interfacing with the Service stratum. It determines the admission of the requested service based on the network policy and the resource availability. It also controls the network element to allocate the resource once it is accepted. Resource and Admission Control Functions (RACF) is responsible for the major part of the admission decision and resource control of the transport function. Details of RACF mechanism can be found in "Overview of ITU-T NGN QoS control", by Jongtae Song et al., IEEE Communication Magazine, Vol. 45, No. 9, September 2007, and ITU-T recommendation Y.2111 "Resource and Admission Control Functions in NGN".

This developing infrastructure needs to be taken account of when considering new QoS mechanisms.

Review of Current Per-Flow QoS Controls

Flow level transport technology is not a new concept. The core technologies for traffic management schemes such as flow level scheduling, policing, and sharing are already available in a commercial product, as described in "Flow based control for Future Internet" by Jongtae Song, presented in Future Internet Forum (FIW) July, 2007. The current deployment of flow base control, however, is limited only at the edge of the network. Typical examples of flow base control are traffic monitoring and packet inspection, PacketCable access, session border controller, edge router, and interworking between two networks. They are mostly stand alone solution at the edge of the network.

However, flow level traffic control only at the edge cannot guarantee the flow level QoS. Furthermore, DiffServ guarantees the QoS only if the premium traffic load is very low (~under 10%), as described in "Providing guaranteed services without per flow management", by I. Stoica and H. Zhang, in CM SIGCOMM, September 1999, pp. 91-94. On the other hand, having scalable control architecture for flow level traffic control along the data path is a challenging issue, because the number of flows in a network is huge.

There are several schemes proposed for the scalable control of traffic using flow level mechanisms. These are listed below.

(1). Flow Aware Network (FAN) France Telecom proposed a Flow Aware Network (FAN), as described in "A new direction for quality of service: Flow-aware networking", by S. Oueslati and J. Roberts, in Proc. Conference on Next Generation Internet Network (NGI), April 2005. FAN applies three different regimes based on the network status. They are the "transparent regime", "elastic regime", and "overload regime". The transparent regime is applied when the network has no congestion at all. The elastic regime is applied when the network experiences the occasional traffic congestion because of a few high rate data flows. The overload regime is applied when the traffic overloads the link capacity in the network.

No traffic control is required in the transparent regime. The traffic control is effective only in the overload or elastic regime. In the elastic regime, the network enforces the bandwidth limit for every flow. Every flow is assigned the same amount of bandwidth. In the overload regime, new flows are blocked to protect existing flows. To reduce the control complexity, an implicit approach is preferred where no signaling is required for controlling the network. Each node makes locally optimal decision based on local observation.

The main focus of FAN is the simplicity. It requires no signaling. Only implicit admission control is required upon congestion. Although the control mechanism is very simple, it is shown that the network is stabilized remarkably in FAN. However, this architecture is designed mainly for network stabilization aspect. Every flow is treated equally. In order to support various of QoS requirement for individual flow, this architecture should be improved.

(2). Flow Sate Aware (FSA) technologies FSA is developed to provide different QoS for the individual flow. FSA defines the service types based on typical example of Internet services, as described in ITU-T Recommendation Y.2121, "Requirements for the support of flow-state-aware transport technology in an NGN" and "Changing the internet to support real-time content supply from a large fraction of broadband residential users", by J. L. Adams et al., BT Technology Journal, Vol. 23, No. 2, pp. 217-231, April 2005. They are Maximum Rate (MR), Guaranteed Rate (GR), Variable Rate (VR), and Available Rate (AR). GR is designed for applications requiring guaranteed bandwidth for the entire duration of the flow. MR is designed for streaming media such as video and voice. AR is designed for data traffic flow where the application can setup the flow rate at the maximum rate that the network can currently support. VR is the combination of AR and MR. VR could be used for obtaining a maximum response time for a transaction (e.g., a stock trade with maximum transaction time). The MR portion guarantees the minimum guaranteed bandwidth and AR portion is for use available network resource. FSA divides the network resource into two portions. One is Fixed Rate (FR) and the other is Network Rate (NR). FR is requested when flow needs a fixed rate available during the service. NR is requested when flow sends buffered data using network available bandwidth. Service type GR and MR request FR, AR requests NR, and VR requests both NR and FR. The detail requirement is defined in ITU-T Recommendation Y.2121, "Requirements for the support of flow-state-aware transport technology in an NGN".

Figure 1:
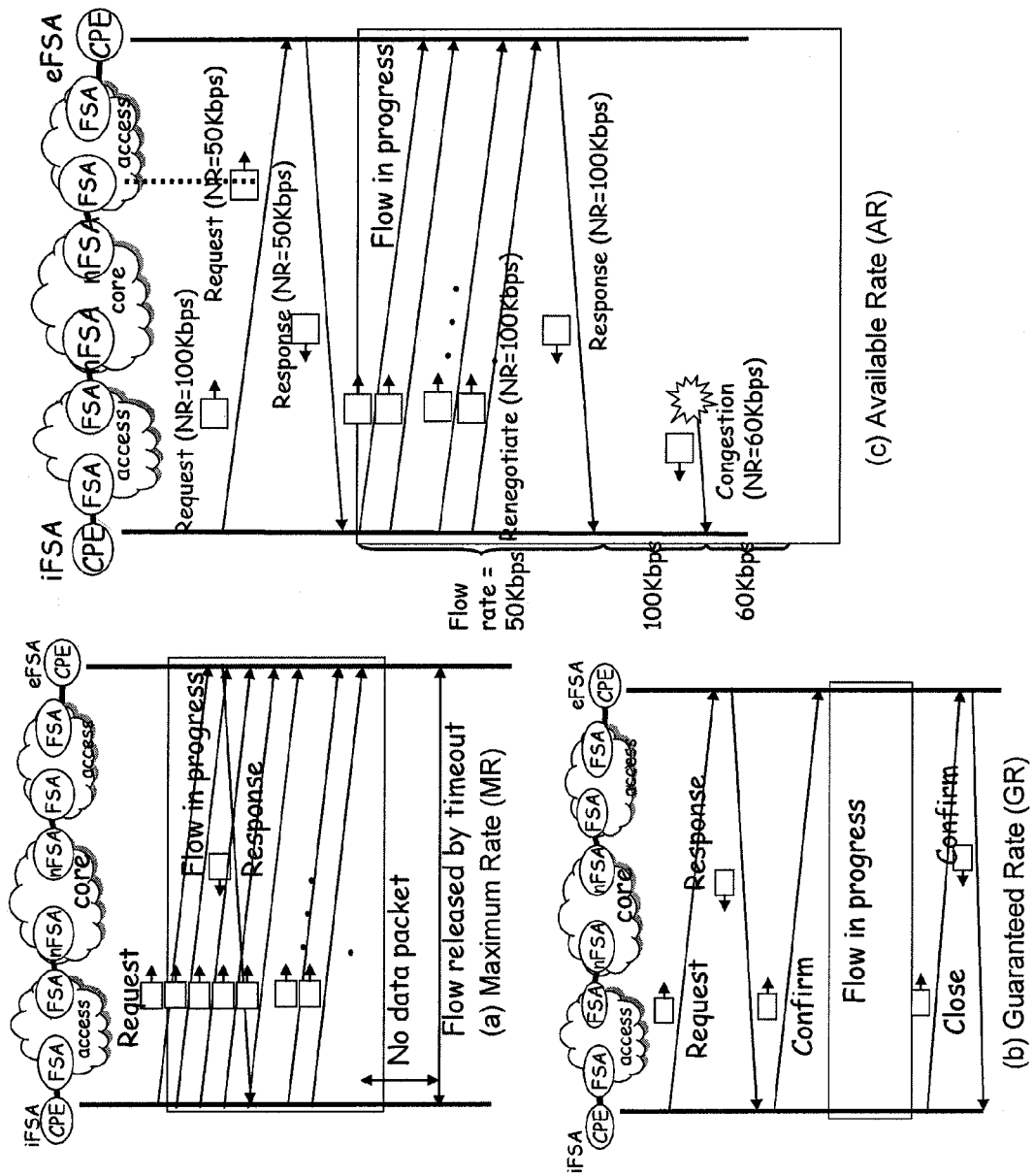
FIG. 1 illustrates the prior art relating to in-band only FSA signaling.

FR and NR are requested by the signaling, as described in ITU-T Study Group 11, Draft Q.flowstatesig: signaling protocols and procedures relating to Flow State Aware access QoS control in an NGN by J. L. Adams, and every node along the path configures its resource based on the requested FR and NR. For the call setup signaling, the source node and destination node exchanges the control messages. [FIG. 1] describes the signaling procedure for the service type MR, GR, and AR. In the ingress FSA (iFSA) and egress FSA (eFSA) exchanges the request, response, confirm, renegotiate, and confirm message for request the transport resource. For MR, iFSA sends the data traffic before receiving the response from eFSA. MR is designed based on the concept of the conditional guaranteed bandwidth, as described in "Changing the internet to support real-time content supply from a large fraction of broadband residential users", by J. L. Adams et al., BT Technology Journal, Vol. 23, No. 2, pp. 217-231, April 2005, and ITU-T Recommendation Y.1221 Amendment 2 (2005), Traffic control and congestion control in IP-based networks. For GR, it needs to know the explicit start and ending time of the flow. Therefore, it sends confirm and close messages for acknowledging every transit node reserves and release the requested bandwidth. The service type AR is designed to use network available resource. iFSA and other FSA nodes continuously monitor the network available resource and adjust the NR accordingly.

Both approaches, FAN and FAS, give an insight for flow based traffic control. FAN shows that even very simple flow level traffic control can stabilize the network efficiently. FSA shows that the network resource can be divided into FR and NR. It also indicates that the transit nodes should be controlled for end-to-end flow level QoS.

However, the two approaches have outstanding issues. As mentioned earlier, FAN is not designed for supporting various QoS requirement of the service. Its main objective is stabilizing the overall network performance. In this viewpoint, FAN treats every flow equally. This may stabilize the transport network in general, but the network provider cannot generate additional profit, because FAN cannot support the service that has special QoS treatment. Good business model is hardly found in this case.

FSA is designed for supporting various QoS requirement. Its implementation can be done in both the in-band signaling, as described in ITU-T Study Group 11, Draft Q.flowstatesig: signaling protocols and procedures relating to Flow State Aware access QoS control in an NGN by J. L. Adams, and out-of-band signaling. The in-band signaling procedure requires the every node exchanges the request and response. The request need to be examined by the all the transit node. The destination node generates the response message, and source node finds the agreed rate from the response message. In this approach every FSA node should maintain the flow state.

Requiring FSA signaling feature in every user terminal is possible. However, by making the terminal independent of FSA, we can have several benefits. First, the terminal usually has different capability. The network architecture should be flexible enough to support multiple types of terminal in a network. The terminal can support transport QoS signaling but also has application signaling. The application signaling is common for all terminal types. In order to support more terminal types, the QoS signaling of terminal should be designed in application level. Second, the network security is important in managed network. Enabling the signaling function in the terminal may cause the security hole in the network. For resolving this problem, ITU-T Recommendation Y.2121, "Requirements for the support of flow-state-aware transport technology in an NGN" specifies the mechanism to authorize the in-band signaling in the application signaling phase. FSA signaling initiated in the network side from the network edge can be another option to avoid the security problem.

In both FAN and FSA approaches, focus is mainly in the transport control. In order to take account of the existing deployment of QoS functions, the concept of RACF function needs to be considered.

(3). FSA with out-band signaling In this proposal, the FSA signaling is combined with RACF. CPE (Customer Premises Equipment) or user terminal should be able to request the flow level resource in any kind of application signaling. In this aspect, the CPE and user terminal should be protocol independent.

Second, this proposal focuses flow-based control in the access network, not the core. In the access network, user data traffic is statically routed to the edge of the core network, and the downstream data traffic is statically forwarded from the edge of the core network to the end user. Core supports both IP based dynamic routing and layer 2 based static forwarding. The traffic volume, number of flows, and dynamicity of traffic are different in the core and access. Traditional access network controls the bandwidth based on subscribed bandwidth per user in L2 level. For flow level traffic control, however, the bandwidth should be controlled by individual flow. Flow awareness capability is required in the access nodes. The static packet forwarding and scheduling in the flow level granularity is required in the access network. The call by call traffic control and policy enforcement from control plane (e.g., RACF) should be done in micro flow level. In the core, the number of flows is high and call by call flow level control in RACF is difficult to achieve. In the core side network, therefore, the traffic should be controlled in aggregate level rather than micro flow level. The reliability and monitoring capability will be more important in the core. The flow based traffic control and the aggregated traffic control should be translated at the edge of the core network.

Figure 2:
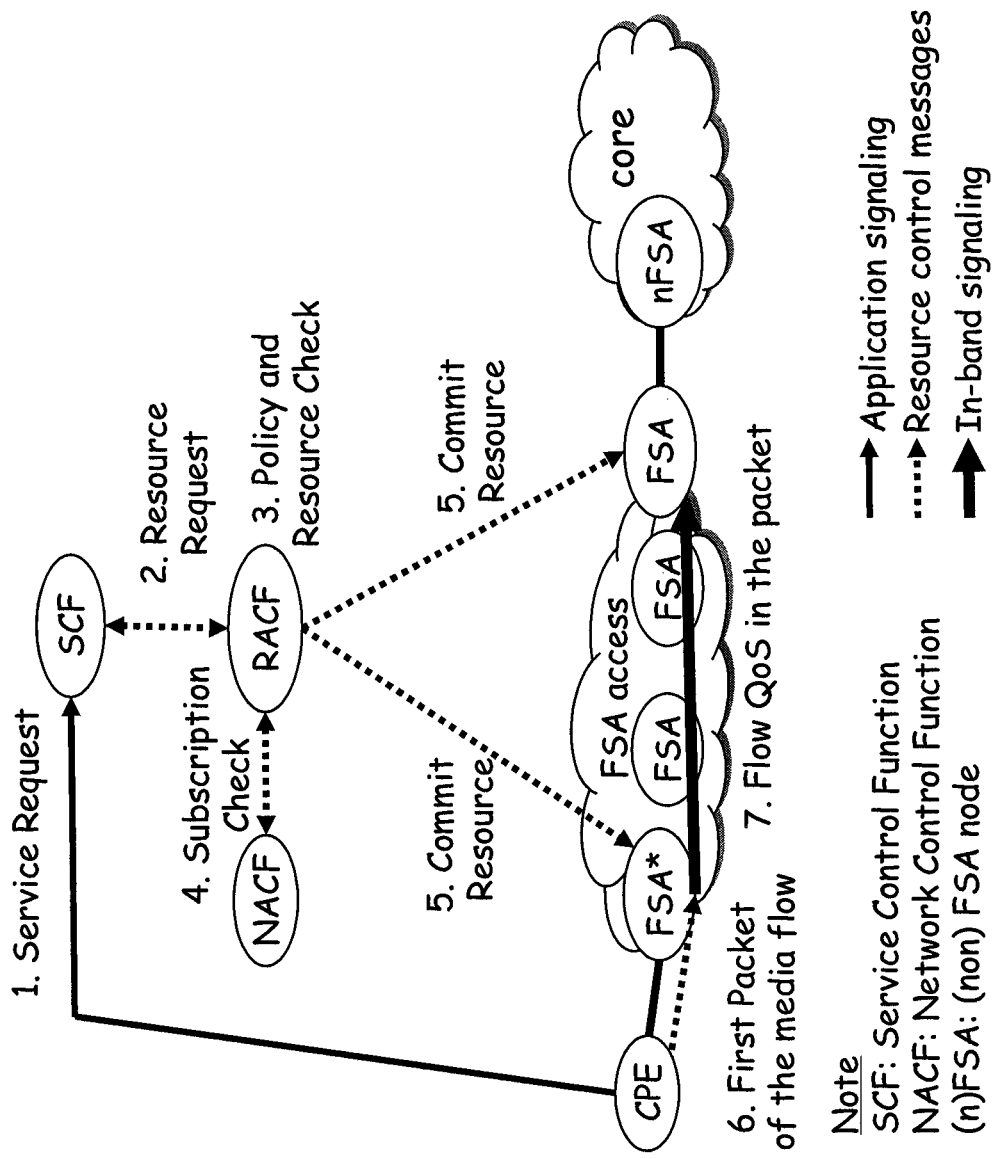
FIG. 2 illustrates alternative prior art relating to a combination of in-band FSA signaling and out-of-band signaling.

These design principles are further illustrated in FIG. 2.

However, none of the above proposals provides a method of managing contention in a packet network which allows flow-based QoS mechanisms to operate without end-user signaling and support:
  Preference priority control of some flows in the event of congestion or sudden re-routing of traffic in the event of a network link failure.
  Admission of variable rate, delay-sensitive flows requiring some minimum guaranteed bandwidth.
  Management of the fastest transfer time (highest available transfer rate).

In 'Flow State Aware QoS Management Without User Signaling', U.S. Non-Provisional application Ser. No. 12/628,927 filed Dec. 1, 2009, and 'Flow State Aware QoS Aggregate Management Without User Signaling', U.S. Provisional Application No. 61/185,843 filed Jun. 10, 2009, solutions are described that do not require signaling. Both solutions assume a fixed assignment of capacity is provided to each aggregate VLAN. Solution in U.S. Non-Provisional application Ser. No. 12/628,927 filed Dec. 1, 2009 gives every flow either a guaranteed rate or some assignment of a minimum rate and some assignment of the remaining unused capacity which is adjusted according to the number of flows and the preference priority of a flow. Solution in U.S. Provisional Application No. 61/185,843 filed Jun. 10, 2009 does not assign capacity to a single flow and does not discard any packets of any flows until the fixed capacity of an aggregate is nearing congestion. It causes less packet deletions than U.S. Non-Provisional application Ser. No. 12/628,927 filed Dec. 1, 2009, although, if there is evolution towards some use of signaling for some of the services and for some of the flows, U.S. Provisional Application No. 61/185,843 filed Jun. 10, 2009 is potentially more unfair on those flows that are being policed through signaling while other flows, established without signaling, are free to change their rates arbitrarily. In this case, U.S. Non-Provisional application Ser. No. 12/628,927 filed Dec. 1, 2009 is believed to provide a fairer arrangement. All the aforesaid patent applications are incorporated by reference herein.

Another solution that does not require end-user signaling is described in 'Flow State Aware Management of QoS Through Dynamic Aggregate Bandwidth Adjustments', U.S. Non-Provisional application Ser. No. 12/828,150, filed Jun. 30, 2010, which is incorporated by reference herein. In this case an additional level of QoS management is described that allows VLANs or other aggregates of flows to be dynamically adjusted in terms of their capacity or bandwidth whenever pre-arranged thresholds are reached, based on measured rates or other alerts.

Figure 4:
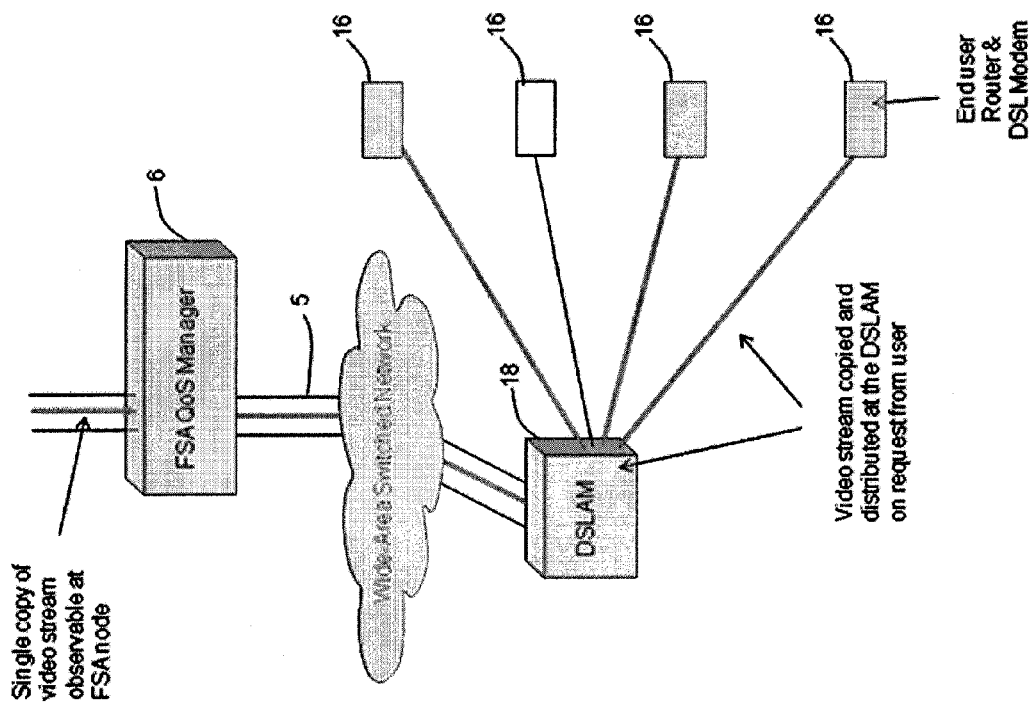
FIG. 4 illustrates an example scenario of a FSA QoS manager, labeled in the figure as function 6, that cannot directly observe all the flows reaching any one end user. Downstream from function 6 is a DSLAM (function 18) that is acting as a multicasting function and is inserting additional flows towards end-user equipment 16.
Figure 5:
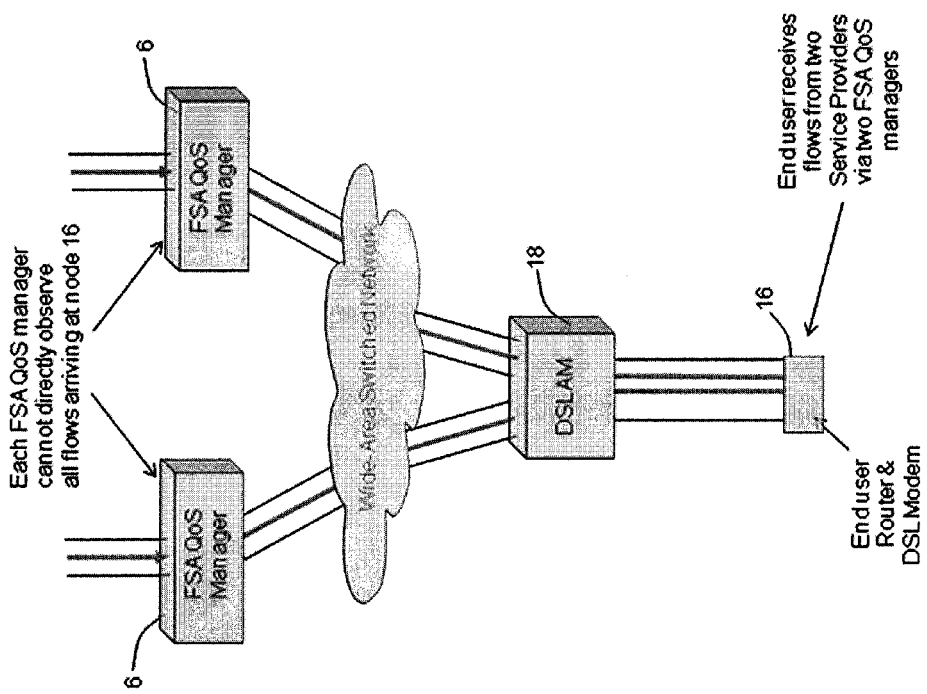
FIG. 5 illustrates another scenario of a FSA QoS manager (function 6), that cannot directly observe all the flows reaching any one end user. In this case there are two functions 6 that manage separate groups of flows that can be forwarded to an end user.

However, none of the solutions described above allows QoS management to make allowance for the capacity that flows may consume when such flows are being received by an end user but are not visible or detectable as a stream of packets at the point in the network where Flow State Aware QoS management is deployed (see FIGS. 4 and 5).

Figure 3:
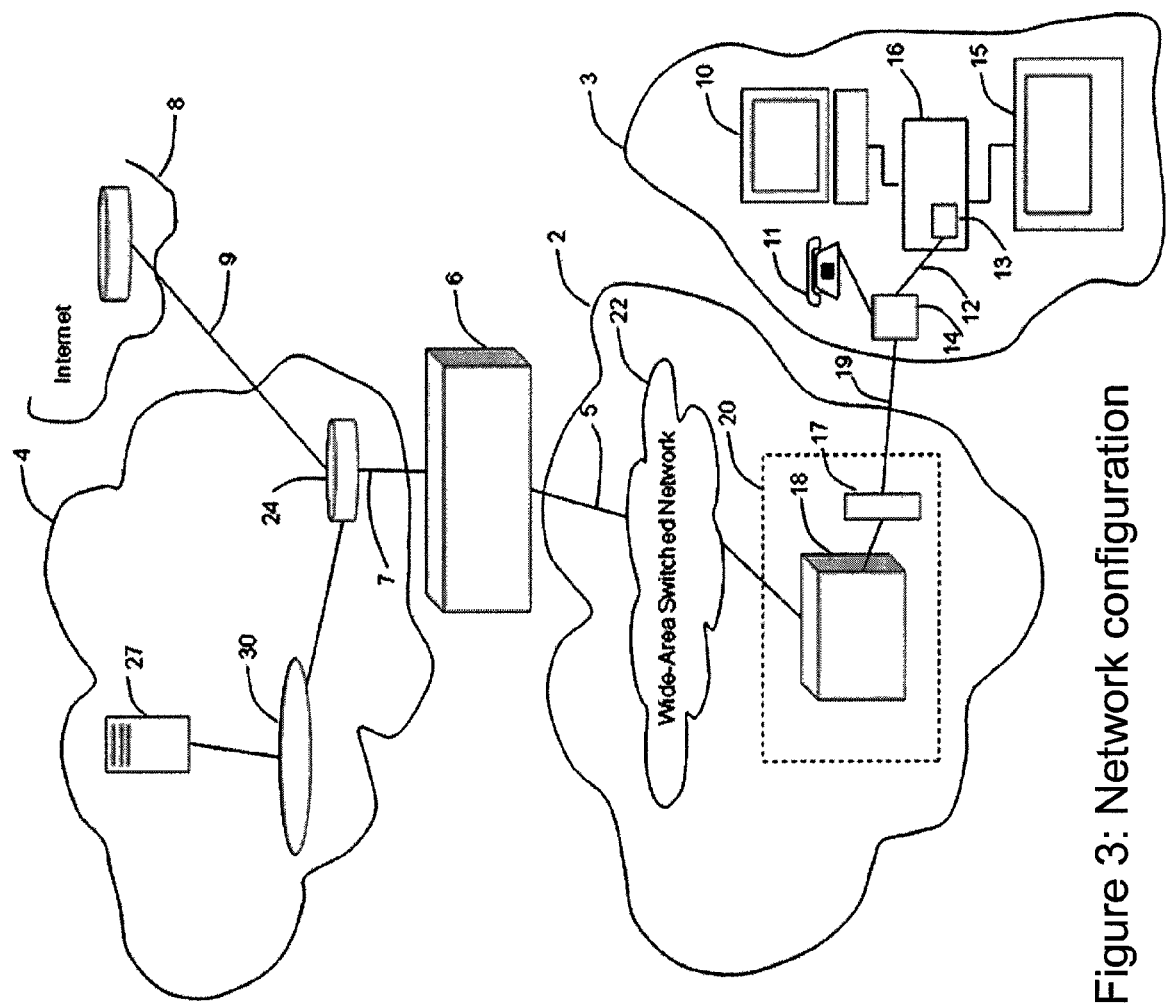
FIG. 3 illustrates the high-level network configuration for the realization of flow-based services.

In one or more embodiments of the present invention, an internetwork (FIG. 3) comprises a user's home network 3, whereas component 2 of FIG. 3 is either an IP routed network or an ATM network or an Ethernet network or layer 1 cross-connection, such as SDH. In FIG. 3 is also a pair of copper wires 19 connecting the user's home network 3 to network 2, an Internet Service Provider's (ISP's) local area network 4, a flow-based QoS manager 6, a network link 5 that represents capacity that the ISP uses to deliver multiple flows to (or receive from) multiple end user networks 3. The ISP network link 7 would represent the input packets into the flow-based QoS manager 6 for flows travelling downstream from the ISP's network 4. The ISP's local area network 4 is connected to the Internet 8 via an Internet link 9.

In one or more embodiments of the present invention, the network 2 comprises exchange-housed equipment (17,18) housed in the local telephone exchange building 20 and a wide-area network 22 which connects a plurality of such DSLAMs 18 (there is normally one or more DSLAMs per exchange building, only one exchange building is shown in the drawing) towards the flow-based QoS manager 6. As will be understood by those skilled in the art, the exchange-housed equipment includes a Digital Subscriber Line Access Multiplexer (DSLAM) 18 shared between many users and, for each pair of copper wires 19, a splitter unit 17 which terminates the pairs of copper wires 19. The splitter unit 17 is effective to send signals within the frequency range used for normal telephony to the Public Switched Telephone Network (not shown) and to send signals in higher frequency bands to the DSLAM 18.

In one or more embodiments of the present invention, the user's home network may comprise a PC 10, a digital television 15, a splitter unit 14, a router/set-top box 16 which incorporates an Asymmetric Digital Subscriber Line (ADSL) modem 13, a cable 12 interconnecting the modem 13 and the splitter unit 14, and cables connecting the router 16 to the PC 10 and the digital television 15. The splitter unit 14 is effective to send signals within the frequency range used for normal telephony to the user's telephone 11 and to send signals in higher frequency bands to the ADSL modem 13. The ADSL modem 13 represents the network termination point of network 2.

In one or more embodiments of the present invention, the ISP's network 4 comprises an IP router 24, a content provider's video server 27, and a Local Area Network 30 which interconnects them. The previously mentioned Internet link 9 is connected to the IP router 24.

Broadband services typically utilize Ethernet as the layer 2 protocol. Again, typically in such a case, the DSLAM terminates the ATM if PPoA is used over the copper pair, and the DSLAM encapsulates the PPP payload in Ethernet for forwarding to the function 6. In one or more embodiments of the present invention, link 5 is the aggregate capacity between function 6 and the DSLAMs and it is further subdivided into separate VLANs with either dedicated capacity per DSLAM or capacity that can be borrowed but is pre-emptively available when traffic conditions require the full capacity that can be available towards or from any one DSLAM.

Two other connection products 5 are based on the IP layer and routing across an MPLS platform.

In these cases, the PPPoE connections will terminate on a BRAS function within network 22. The two options are:
 Using L2TP between the BRAS (acting as the LAC) and the ISP LNS router or direct to the service provider for them to provide the HG functions L2TP LNS (L2TP pass through) etc.
 Create per service provider IP VPN's.

FIG. 4 shows an example scenario where there is a FSA QoS manager (function 6) but, downstream from function 6 is a DSLAM (function 18) that is also performing multicast distribution. The end users that receive multicast flows cannot be directly observed by function 6. However if function 6 were informed of these extra flows (e.g. as shown by the inclusion of function 40 in FIG. 6) and either it determined their bit-rates via its classification information or it (function 6) is informed of their bit-rates via measurement information provided by function 40 (see FIG. 6), then it could make allowance for the reduced capacity available for other flows. In such an arrangement where function 6 makes allowance for multicast flows, the multicast flows themselves are effectively the highest priority flows since they are never subject to any QoS actions by function 6.

FIG. 5 shows a second exemplary scenario where some flows arriving at an end-user cannot be observed by any one function 6. In this case there are two separate aggregate capacities that are under the separate QoS management of two functions 6. There may be different QoS policies applied on each of the two aggregates. Again, the inclusion of a single shared function 40 or multiple functions 40 co-located, or in-line, with function 16 would enable both functions 6 to be informed of flows that they cannot directly observe and perform either:
 QoS actions based on one of the two sets of flows being pre-configured as highest priority (e.g. one set of flows is video).
 QoS actions based on alerts provided by function 40 and based on measured capacity usage at the function 40 (e.g. when capacity usage rises above a pre-determined percentage, as measured by function 40, both functions 6 are informed and take action to limit any further new flows, or to allows new flows if high priority but delete packets of other flows to maintain no overall increase in load, or perform some other pre-determined policy).

Figure 7:
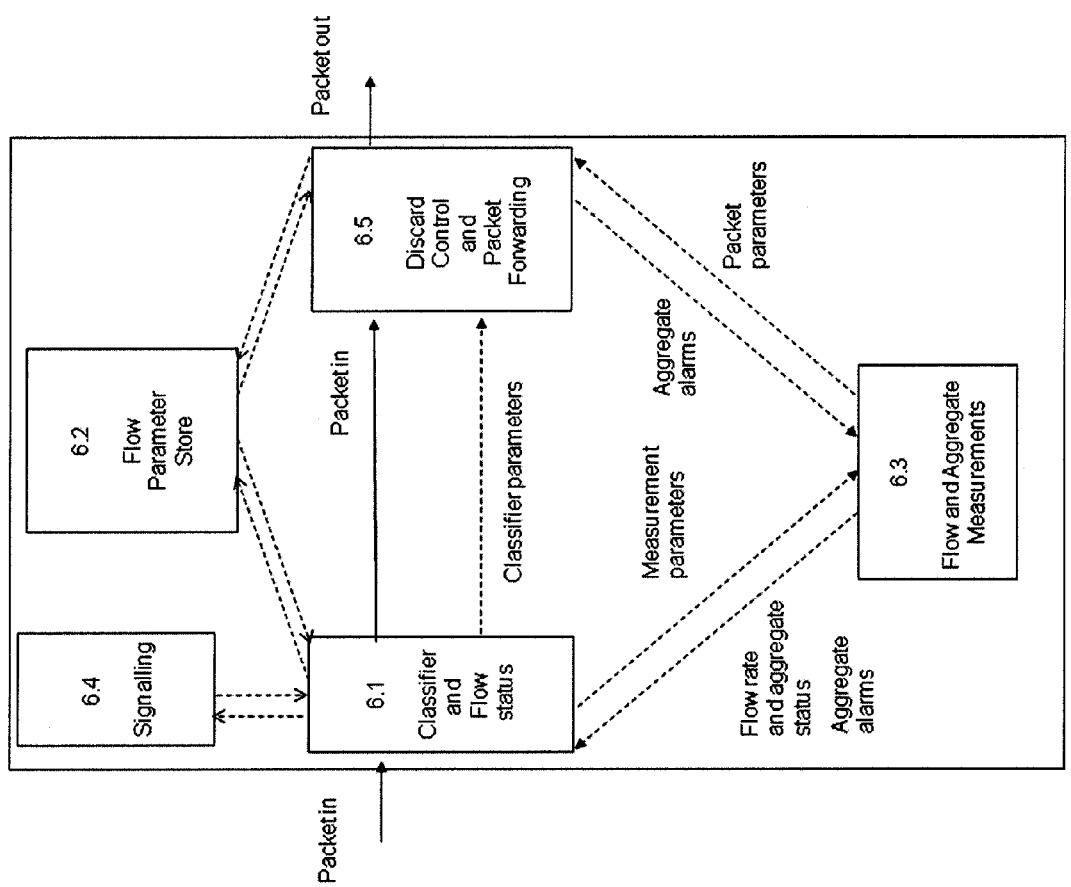
FIG. 7 illustrates an expansion of the function 6 according to one embodiment of the invention, showing the classifier and main logic function 6.1; the flow parameter store, 6.2; the flow and aggregate measurement function 6.3; the signaling receiving and sending function 6.4; the packet discard and packet forwarding function 6.5.
Figure 8:
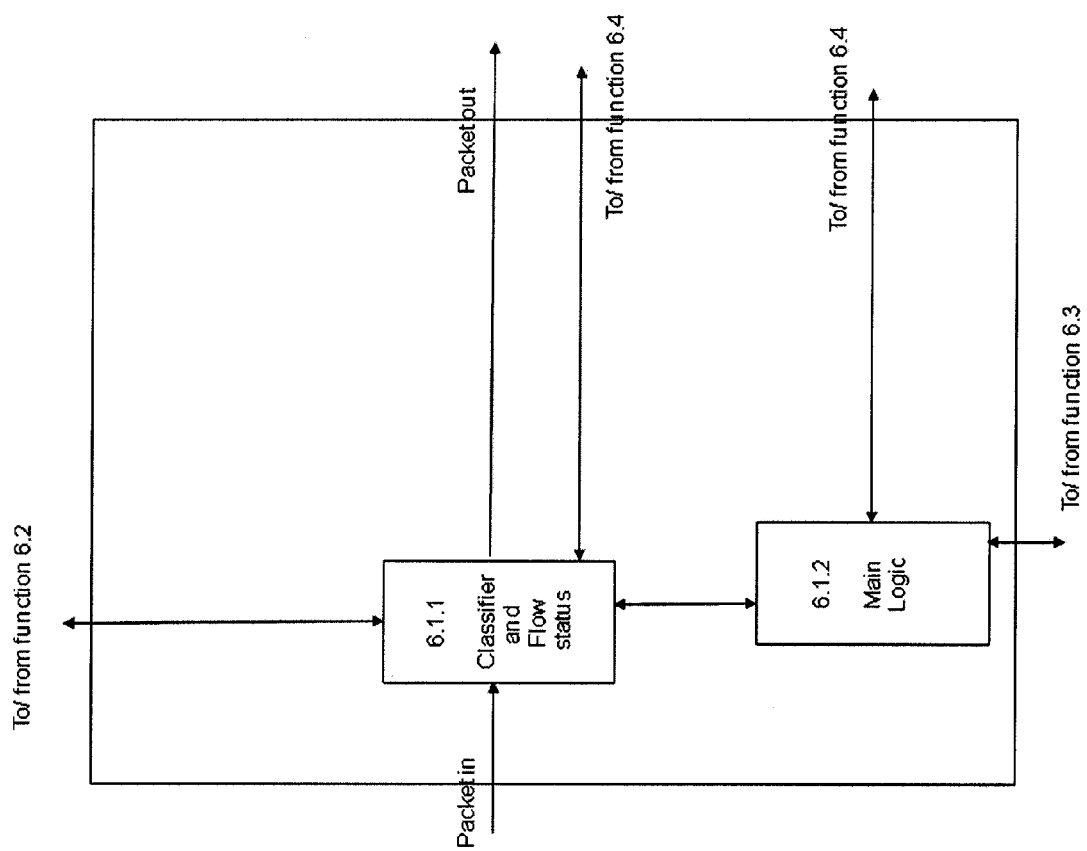
FIG. 8 illustrates an expansion of function 6.1, showing the classifier function 6.1.1, and the main logic function 6.1.2.

FIG. 7 relates to the first exemplary preferred embodiment and shows an expansion of the function 6, containing sub-functions 6.1 to 6.5. The classifier and flow status function 6.1.1 (see FIG. 8) can be implemented as in function 6.1 of U.S. Provisional Application No. 61/185,843, filed Jun. 10, 2009, or 6.1 of U.S. Non-Provisional application Ser. No. 12/828,150, Jun. 30, 2010 except for:
 the additional capability, not implemented in function 6.1 of U.S. Provisional Application No. 61/185,843, filed Jun. 10, 2009, or 6.1 of U.S. Non-Provisional application Ser. No. 12/828,150, filed Jun. 30, 2010, of forwarding any signaling packets that it detects towards function 6.4;
 the additional capability, not implemented in function 6.1 of U.S. Provisional Application No. 61/185,843, filed Jun. 10, 2009, or 6.1 of U.S. Non-Provisional application Ser. No. 12/828,150, filed Jun. 30, 2010, of being capable of receiving signaling packets for onward forwarding from function 6.4 and classifying them typically as very high priority output packets or some other priority level and then forwarding them towards function 6.5.
 the additional capability, not implemented in function 6.1 of U.S. Provisional Application No. 61/185,843, filed Jun. 10, 2009, or 6.1 of U.S. Non-Provisional application Ser. No. 12/828,150, filed Jun. 30, 2010, of determining flow or aggregate flow rate tolerance changes (for example, as a result of receiving signalled information on a new flow identity) and forwarding rate tolerance changes to function 6.1.2.

In one or more embodiments of the present invention, the results of the classifier 6.1.1 look up of a new flow identity are recorded as components of the flow status of the flow and are stored in function 6.2 which, again, can be implemented as in function 6.4 of U.S. Provisional Application No. 61/185,843, filed Jun. 10, 2009, or 6.4 of U.S. Non-Provisional application Ser. No. 12/828,150, filed Jun. 30, 2010.

In one or more embodiments of the present invention, functions 6.3 and 6.5 can also be implemented as in corresponding functions 6.3 and 6.2 of U.S. Provisional Application No. 61/185,843, filed Jun. 10, 2009.

In one or more embodiments of the present invention, function 6.4 receives information via 6.1.1 from one or more functions 40, or one or more functions 6 where this information is contained in signals. The signaled information includes at least a flow identity. For the purpose of receiving signals and validating them, function 6.4 implements a signaling protocol, for example as defined in ITU-T Study Group 11, Draft Q.flowstatesig: signaling protocols and procedures relating to Flow State Aware access QoS control in an NGN', by J. L. Adams.

Figure 10:
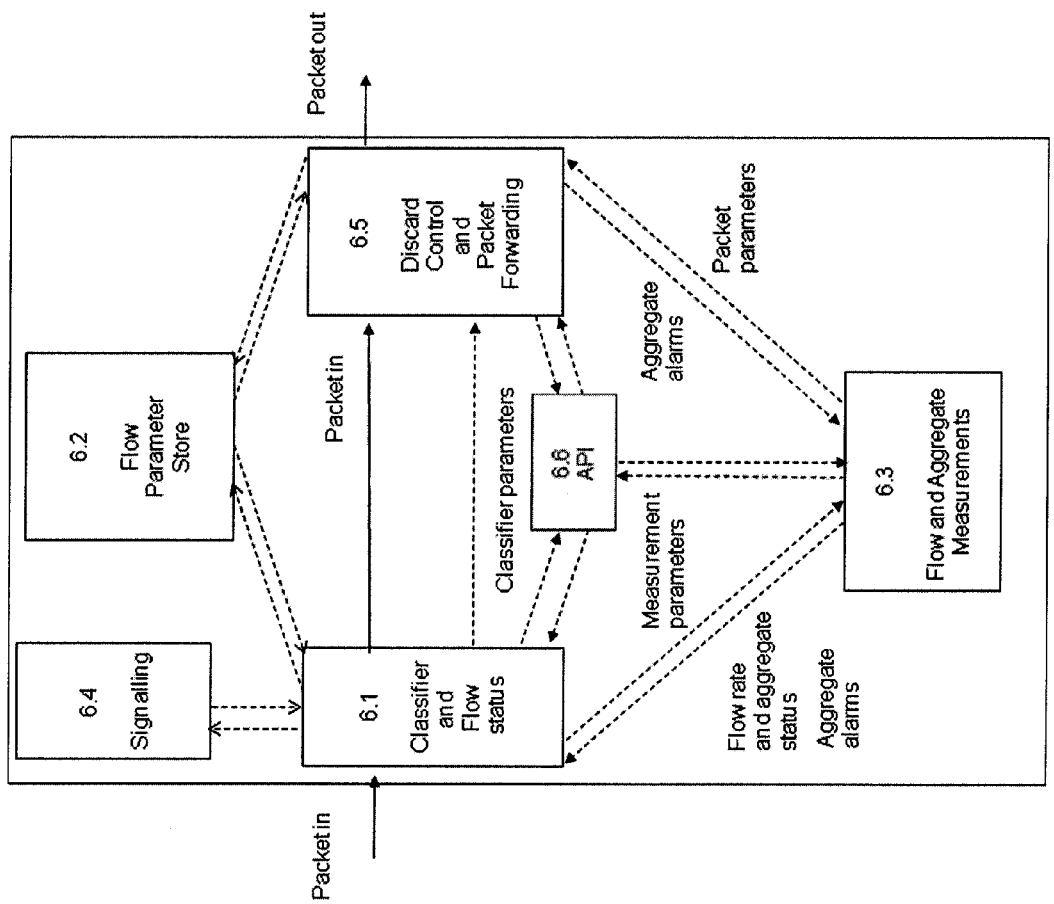
FIG. 10 illustrates an alternative expansion of the function 6 according to another embodiment of the invention, showing an additional API function 6.6.

In one or more embodiments of the present invention, information received in signals by function 6.4 is forwarded to function 6.1.2. Alternatively, a subset of the information that may be signalled can be forwarded to function 6.1.2 from an application via an API (function 6.6, see FIG. 10). The signalled information includes but is not limited to:
 Flow identity
 Measurements relating to flows, groups of flows or flow aggregates
 Classification information relating to flows, groups of flows or flow aggregates
 Cessation information relating to flows, groups of flows or flow aggregates.
 Measurement commands relating to either new measurements or existing measurements, including but not limited to:

Starting a new measurement of rate or rate jitter on a specified set of flow identities or a flow aggregate.

Stopping a measurement of rate or rate jitter on a specified set of flow identities or a flow aggregate.

Forward a measurement or a set of measurements.

Recording events in terms of frequency, total number of events and timings related to events, including the start time of an event, the stop time of an event, the duration of an event, the time between successive events, where such events include but are not limited to:

Packet deletions

A rate increasing above a threshold or comparison value

A rate decreasing below a threshold or comparison value

A rate jitter above a comparison value

Packet arrivals of a given set of flow identities

Based on the information received in signals by 6.4 and forwarded to 6.1.2, or via the API 6.6, the function 6.1.2 will:

Configure measurements in function 6.3.

Request measurement outputs from function 6.3.

Forward flow identity and classification information to 6.1.1 so that previously unobserved flows can be added to the flow identity store 6.2.

Forward requested information via the API 6.6 or via the signaling function 6.4.

In one or more embodiments of the present invention, function 6.1.1, on discovering a new flow identity will forward information to 6.1.2 to enable it to configure new capacity limits for flows or flow aggregates, including the rate tolerances on policing functions associated with flows or flow aggregates. Function 6.1.2 configures function 6.3 utilising this information.

In one or more embodiments of the present invention, function 6.4 also outputs information for onward forwarding to other functions 6 or functions 40. Again, function 6.4 implements a signaling protocol such as in ITU-T Study Group 11, Draft Q.flowstatesig: signaling protocols and procedures relating to Flow State Aware access QoS control in an NGN', by J. L. Adams, for output signaling. Such output signals are passed via to 6.1.1 for onward forwarding and QoS classification.

In one or more embodiments of the present invention, function 6.4 also receives information generated by 6.1.2 that will be used for the output of new signals, including information generated by function 6.3 on measurements or alerts. Function 6.1.2 formats information received from 6.3 and passes it either to function 6.6, or 6.4 depending upon which of these functions had forwarded the initial request for the information. In the case of passing such information to function 6.4, the information is inserted into signaling packets that are then passed back to 6.1.1 for classification and onward forwarding to function 6.5.

Figure 9:
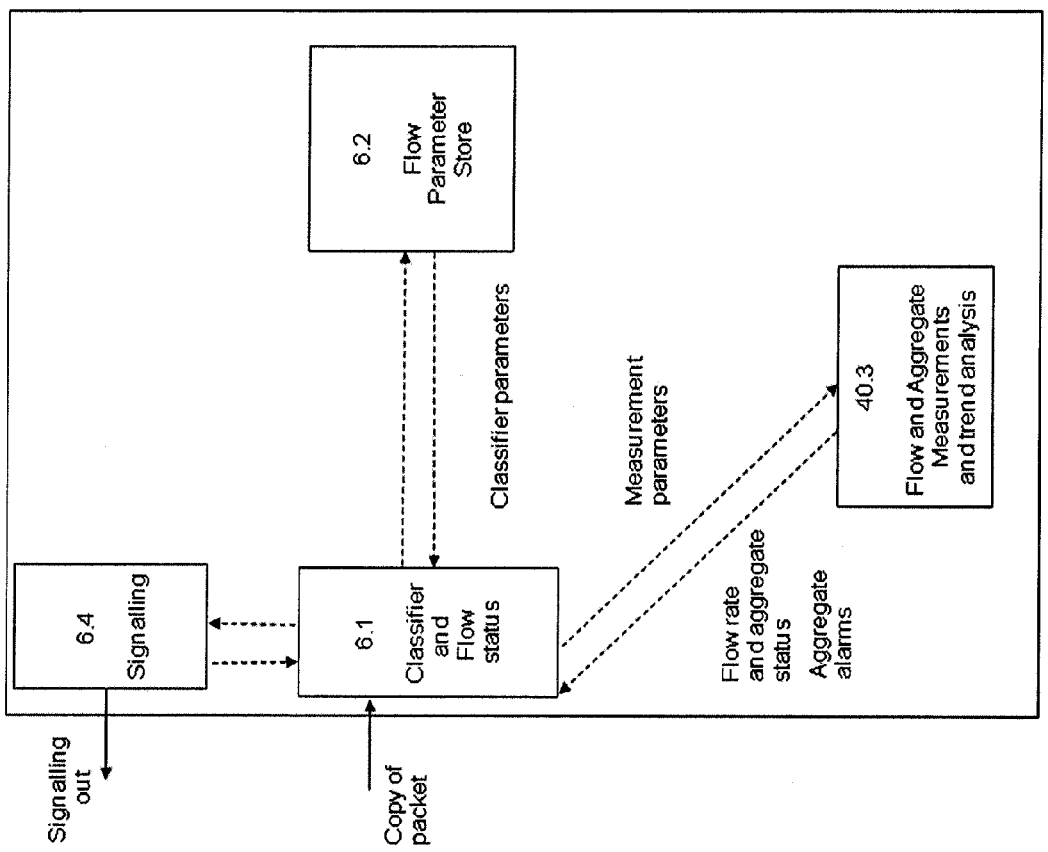
FIG. 9 illustrates an expansion of the function 40 according to one embodiment of the invention, showing the classifier and main logic function 6.1; the flow parameter store, 6.2; the flow and aggregate measurement and trend analysis function 40.3; the signaling receiving and sending function 6.4.
Figure 11:
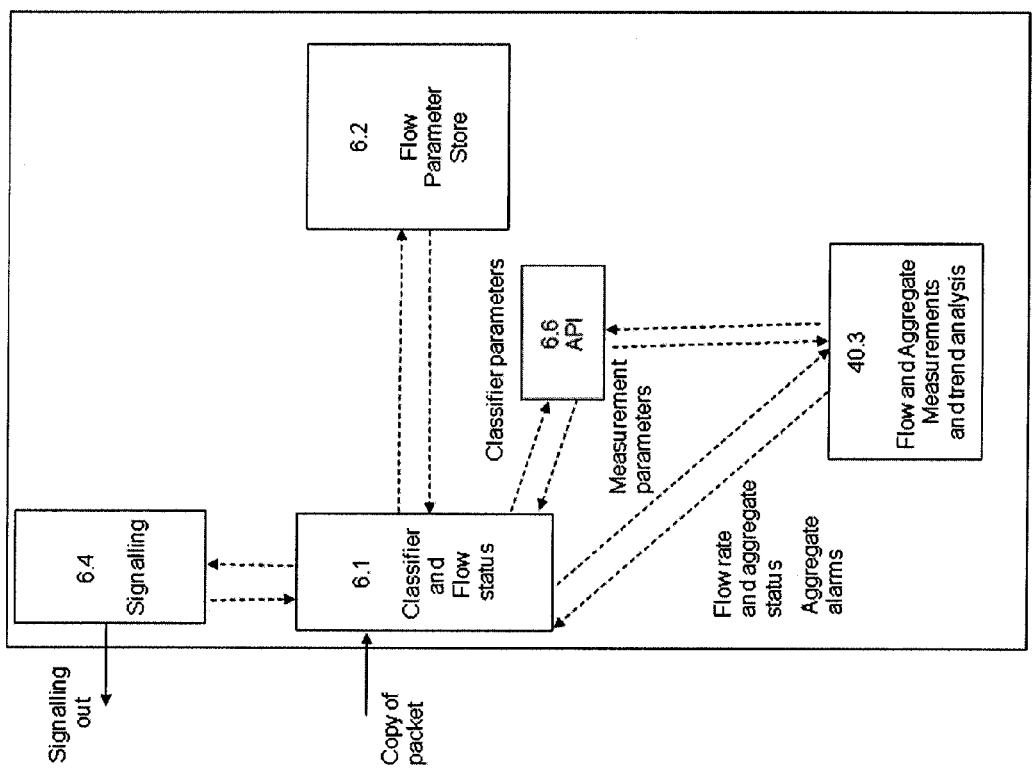
FIG. 11 illustrates an alternative expansion of the function 40 according to another embodiment of the invention, showing an additional API function 6.6.

FIGS. 9 and 11 show an exemplary expansion of function 40, showing functions 6.1, 6.2, and 6.4 (FIG. 9) and the additional API function 6.6 (FIG. 11), where all of these functions are already described. Both FIGS. 9 and 11 show an additional function 40.3 which is an extension of function 6.3. This function 40.3 responds to function 6.1.2 as already described for function 6.3 but, additionally, function 40.3 provides:

Trend analysis of flows, including but not limited to:

Rate trends over a time interval on a flow aggregate.

Frequency of specific preference priorities over a time interval.

Frequency of flows from a specific source address including, or not including, source port identity Correlation across a group of flow identities or a flow aggregate of flow starting or cessation times.

Congestion trends on a flow aggregate, including the time dependency of congestion frequency and duration.

An enhanced command/configuration capability, enabling function 6.1.2 to set up trend analysis measurements based upon signalled information from another function 40 or another function 6, or via an API (see FIG. 11).

An enhanced memory allowing the storage of more information relating to flows or events relating to flows.

An enhanced reporting capability, enabling trend analysis information, including but not limited to the information already described, to be forwarded via function 6.1.2 to either 6.6 or for output signals via 6.4.

Figure 12:
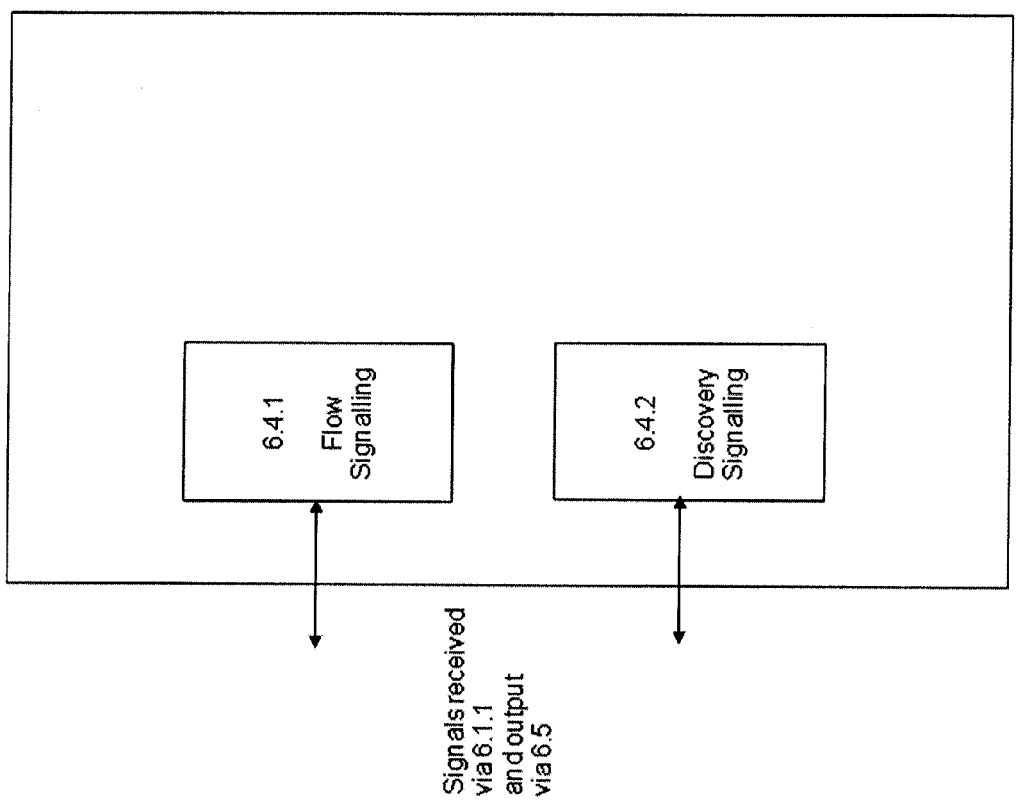
FIG. 12 illustrates an alternative embodiment of function 6.4 including discovery signaling to determine neighbor FSA functions.

FIG. 12 shows an alternative exemplary embodiment of function 6.4, incorporating a function 6.4.1 dedicated to flow signaling whose functions have already been described, plus a function 6.4.2 that performs discovery of neighbour FSA functions.

Function 6.4.2 initiates signals, typically as part of bringing a function 6 into service in a given subnet. For those skilled in the art, discovery signaling is well-known and includes:

An announcement signal, providing the IP address of an announcing function 6.4.2 together with the Function 40 or Function 6 capability or an implemented subset of these functions associated with the announcing function 6.4.2, and forwarded to:

A downstream aggregate

An upstream aggregate

Receiving response signals from other functions 40 or functions 6 and noting their IP address and functional capability included in the response signal and associated aggregate containing the arriving signal including but not limited to:

Function 40 or Function 6 capability or subset of functions implemented.

Aggregate identity associated with the arriving signal.

Function 6.4.2 passes the information recovered from response signals back to function 6.1.2 which maintains a store of aggregates and associated functions 6 or functions 40 that can be reached via those aggregates.

Figure 13:
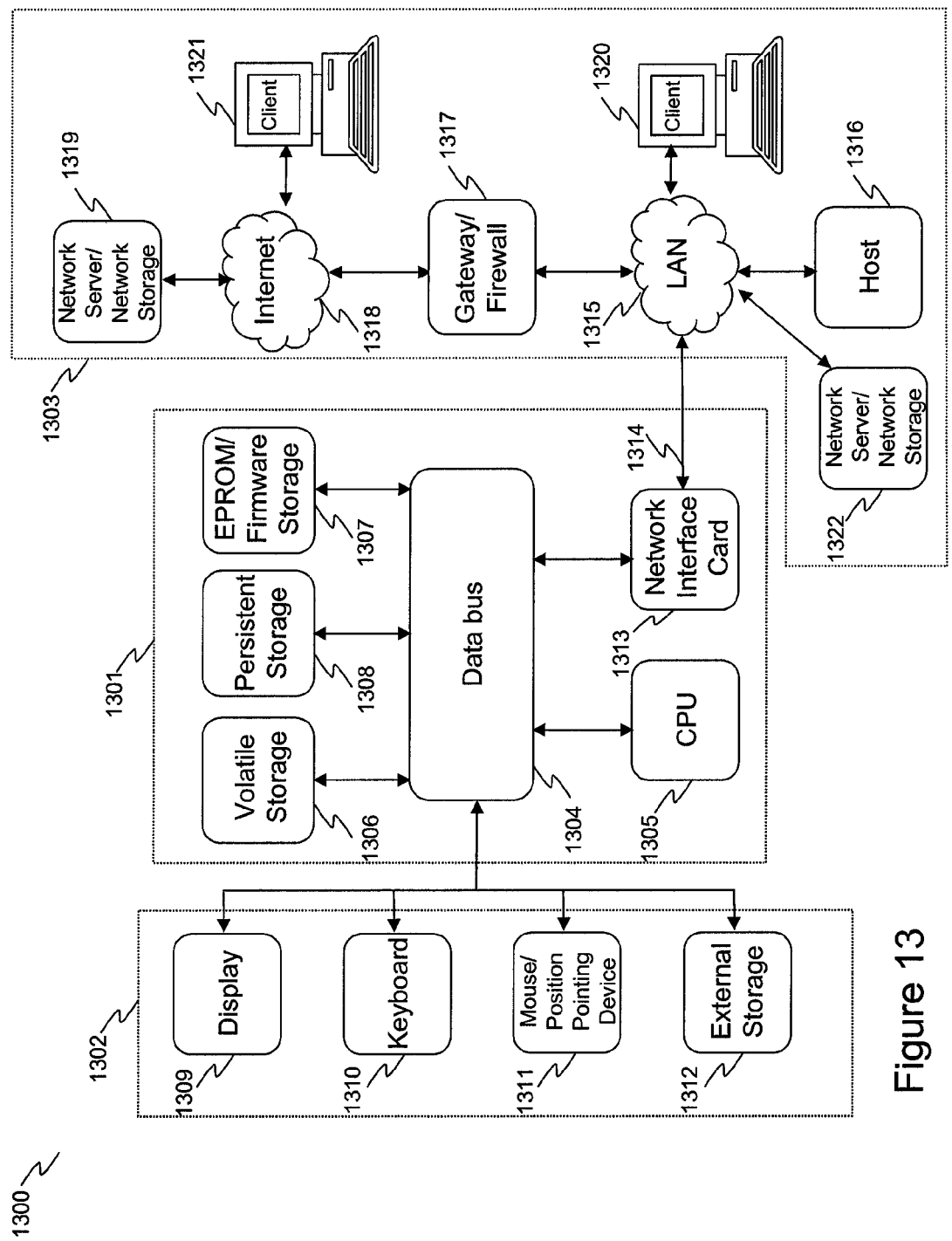
FIG. 13 illustrates an exemplary embodiment of a hardware platform upon which the present invention may be implemented.

FIG. 13 illustrates an exemplary embodiment of a computer platform upon which the inventive system may be implemented.

FIG. 13 is a block diagram that illustrates an embodiment of a computer/server system 1300 upon which an embodiment of the inventive methodology may be implemented. The system 1300 includes a computer/server platform 1301, peripheral devices 1302 and network resources 1303.

The computer platform 1301 may include a data bus 1305 or other communication mechanism for communicating information across and among various parts of the computer platform 1301, and a processor 1305 coupled with bus 1301 for processing information and performing other computational and control tasks. Computer platform 1301 also includes a volatile storage 1306, such as a random access memory (RAM) or other dynamic storage device, coupled to bus 1305 for storing various information as well as instructions to be executed by processor 1305. The volatile storage 1306 also may be used for storing temporary variables or other intermediate information during execution of instructions by processor 1305. Computer platform 1301 may further include a read only memory (ROM or EPROM) 1307 or other static storage device coupled to bus 1305 for storing static information and instructions for processor 1305, such as basic input-output system (BIOS), as well as various system configuration parameters. A persistent storage device 1308, such as a magnetic disk, optical disk, or solid-state flash memory device is provided and coupled to bus 1301 for storing information and instructions.

Computer platform 1301 may be coupled via bus 1305 to a display 1309, such as a cathode ray tube (CRT), plasma display, or a liquid crystal display (LCD), for displaying information to a system administrator or user of the computer platform 1301. An input device 1310, including alphanumeric and other keys, is coupled to bus 1301 for communicating information and command selections to processor 1305. Another type of user input device is cursor control device 1311, such as a mouse, a trackball, or cursor direction keys for communicating direction information and command selections to processor 1305 and for controlling cursor movement on display 1309. This input device typically has two degrees of freedom in two axes, a first axis (e.g., x) and a second axis (e.g., y), that allows the device to specify positions in a plane.

An external storage device 1312 may be coupled to the computer platform 1301 via bus 1305 to provide an extra or removable storage capacity for the computer platform 1301. In an embodiment of the computer system 1300, the external removable storage device 1312 may be used to facilitate exchange of data with other computer systems.

The invention is related to the use of computer system 1300 for implementing the techniques described herein. In an embodiment, the inventive system may reside on a machine such as computer platform 1301. According to one embodiment of the invention, the techniques described herein are performed by computer system 1300 in response to processor 1305 executing one or more sequences of one or more instructions contained in the volatile memory 1306. Such instructions may be read into volatile memory 1306 from another computer-readable medium, such as persistent storage device 1308. Execution of the sequences of instructions contained in the volatile memory 1306 causes processor 1305 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1305 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 1308. Volatile media includes dynamic memory, such as volatile storage 1306.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 1305 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 1305. The bus 1305 carries the data to the volatile storage 1306, from which processor 1305 retrieves and executes the instructions. The instructions received by the volatile memory 1306 may optionally be stored on persistent storage device 1308 either before or after execution by processor 1305. The instructions may also be downloaded into the computer platform 1301 via Internet using a variety of network data communication protocols well known in the art.

The computer platform 1301 also includes a communication interface, such as network interface card 1313 coupled to the data bus 1305. Communication interface 1313 provides a two-way data communication coupling to a network link 1315 that is coupled to a local network 1315. For example, communication interface 1313 may be an integrated services digital network (ISDN) card or a modem to provide a data communication connection to a corresponding type of telephone line. As another example, communication interface 1313 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 1313 sends and receives electrical, electromagnetic or optical signals that carry digital data streams representing various types of information.

Network link 1313 typically provides data communication through one or more networks to other network resources. For example, network link 1315 may provide a connection through local network 1315 to a host computer 1316, or a network storage/server 1317. Additionally or alternatively, the network link 1313 may connect through gateway/firewall 1317 to the wide-area or global network 1318, such as an Internet. Thus, the computer platform 1301 can access network resources located anywhere on the Internet 1318, such as a remote network storage/server 1319. On the other hand, the computer platform 1301 may also be accessed by clients located anywhere on the local area network 1315 and/or the Internet 1318. The network clients 1320 and 1321 may themselves be implemented based on the computer platform similar to the platform 1301.

Local network 1315 and the Internet 1318 both use electrical, electromagnetic or optical signals that carry digital data streams. The signals through the various networks and the signals on network link 1315 and through communication interface 1313, which carry the digital data to and from computer platform 1301, are exemplary forms of carrier waves transporting the information.

Computer platform 1301 can send messages and receive data, including program code, through the variety of network (s) including Internet 1318 and LAN 1315, network link 1315 and communication interface 1313. In the Internet example, when the system 1301 acts as a network server, it might transmit a requested code or data for an application program running on client(s) 1320 and/or 1321 through Internet 1318, gateway/firewall 1317, local area network 1315 and communication interface 1313. Similarly, it may receive code from other network resources.

The received code may be executed by processor 1305 as it is received, and/or stored in persistent or volatile storage devices 1308 and 1306, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the communications network and a methods of operating of a communications network. It is intended that the specification and examples be considered as exemplary only, with a true scope and spirit of the invention being indicated by the following claims.

What is claimed is:

1. A method comprising:
   a. receiving one or more communication packets indicative of a commencement of a new packet flow in a packet subnet, said new packet flow comprising one packet or a plurality of packets;
   b. monitoring the new packet flow to obtain a monitored information about the new packet flow, the monitored information about the new packet flow comprises:
      i. packet header information associated with the new packet flow at any level of encapsulation,
      ii. signaling information related to the identity of the new packet flow,
      iii. physical link information of a physical link on which the one packet or the plurality of packets associated with the new packet flow arrived or will depart,
      iv. a first measured rate representing a flow rate of the new packet flow, or a measured jitter in the first measured rate, and
      v. a second measured rate characterizing a flow aggregate encompassing the new packet flow or a measured jitter in the second measured rate, wherein the flow aggregate comprises a plurality of packet flows directed to an end point; and
   c. detecting the commencement of the new packet flow based on the received one or more communication packets and responsive to the detection of the commencement of the new packet flow:
      vi. storing a flow identifier, the flow identifier representing an identity of the new packet flow;
      vii. retrieving a policy information for determining an initial or a sustained QoS treatment of the new packet flow, wherein the retrieved policy information comprises an identity of one or more network functions configured to receive information related to the new packet flow, wherein the network functions are located at one or more different locations throughout the packet subnet, and wherein the determining of the initial or the sustained QoS treatment is performed using the retrieved policy information and the monitored information about the new packet flow; and
      viii. forwarding information related to the new packet flow to the one or more network functions based on the retrieved policy information, the information being forwarded to the one or more network functions by the packet subnet or through one or more dedicated links, wherein the forwarded information comprises:
      ix. the identity of the new packet flow,
      x. information on the flow aggregate associated with the new packet flow, and
      xi. the monitored information about the new packet flow.

2. The method according to claim 1, further comprising determining a classification information relating to the initial or the sustained QoS treatment of the new packet flow and including the determined classification information in the information related to the new packet flow forwarded to the one or more network functions, wherein:
   the information related to the new packet flow comprises an initial information related to the new packet flow and an additional information related to the new packet flow;
   the initial information related to the new packet flow is forwarded to the one or more network functions without including the classification information; and
   the additional information related to the new packet flow is forward to the one or more network functions when the classification information has been determined.

3. The method according to claim 1, further comprising detecting a cessation of the new packet flow, wherein the detecting of the cessation is performed based on an observation of no further packet arrivals for a pre-determined time interval associated with the identity of the new packet flow, wherein the retrieved policy information further comprises an identity of one or more second network functions configured to receive an information related to the cessation of the new packet flow, the method further comprising, responsive to the detecting of the cessation of the new packet flow, forwarding the information related to the cessation of the new packet flow to the one or more second network functions.

4. The method according to claim 1, wherein upon the receiving of the information related to the new packet flow, the one or more network functions performs a comparison of the identity of the new packet flow with a plurality of flow identities to determine that either:
   i. the identity of the new packet flow is not included in the plurality of flow identities; or
   ii. the identity of the new packet flow is included in the plurality of flow identities.

5. A packet network node comprising:
   a. an input for receiving one or more communication packets indicative of a commencement of a new packet flow in a packet subnet, said new packet flow comprising one packet or a plurality of packets;
   b. means for monitoring the new packet flow to obtain a monitored information about the new packet flow, the monitored information about the new packet flow comprises:
      i. packet header information associated with the new packet flow at any level of encapsulation,
      ii. signaling information related to the identity of the new packet flow,
      iii. physical link information of a physical link on which the one packet or the plurality of packets associated with the new packet flow arrived or will depart,
      iv. a first measured rate representing a flow rate of the new packet flow, or a measured jitter in the first measured rate, and
      v. a second measured rate characterizing a flow aggregate encompassing the new packet flow or a measured jitter in the second measured rate, wherein the flow aggregate comprises a plurality of packet flows directed to an end point; and c. means for detecting the commencement of the new packet flow based on the received one or more communication packets;

d. means for storing a flow identifier, the flow identifier representing an identity of the new packet flow;

e. means for retrieving a policy information for determining an initial or a sustained QoS treatment of the new packet flow, wherein the retrieved policy information comprises an identity of one or more network functions configured to receive information related to the new packet flow, wherein the network functions are located at one or more different locations throughout the packet subnet, and wherein the determining of the initial or the sustained QoS treatment is performed using the retrieved policy information and the monitored information about the new packet flow; and means for forwarding information related to the new packet flow to the one or more network functions based on the retrieved policy information, the information being forwarded to the one or more network functions by the packet subnet or through one or more dedicated links, wherein the forwarded information comprises:

ix. the identity of the new packet flow, x. information on the flow aggregate associated with the new packet flow, and xi. the monitored information about the new packet flow.

6. The packet network node according to claim 5, further comprising means for determining a classification information relating to the initial or the sustained QoS treatment of the new packet flow and including the determined classification information in the information related to the new packet flow forwarded to the one or more network functions, wherein:

the information related to the new packet flow comprises an initial information related to the new packet flow and an additional information related to the new packet flow;

the initial information related to the new packet flow is forwarded to the one or more network functions without including the classification information; and the additional information related to the new packet flow is forward to the one or more network functions when the classification information has been determined.

7. The packet network node according to claim 5, further comprising means for detecting a cessation of the new packet flow, wherein the detecting of the cessation is performed based on an observation of no further packet arrivals for a pre-determined time interval associated with the identity of the new packet flow, wherein the retrieved policy information further comprises an identity of one or more second network functions configured to receive an information related to the cessation of the new packet flow, and wherein, responsive to the detecting of the cessation of the new packet flow, the information related to the cessation of the new packet flow is forwarded to the one or more second network functions.

8. The method according to claim 5, wherein upon the receiving of the information related to the new packet flow, the one or more network functions performs a comparison of the identity of the new packet flow with a plurality of flow identities to determine that either:

i. the identity of the new packet flow is not included in the plurality of flow identities; or ii. the identity of the new packet flow is included in the plurality of flow identities.

\* \* \* \* \*